Sept. 6, 1932.   T. LONGBOTHAM ET AL   1,875,623
AUTOMATIC TIMING MECHANISM
Filed Oct. 1, 1929   2 Sheets-Sheet 2
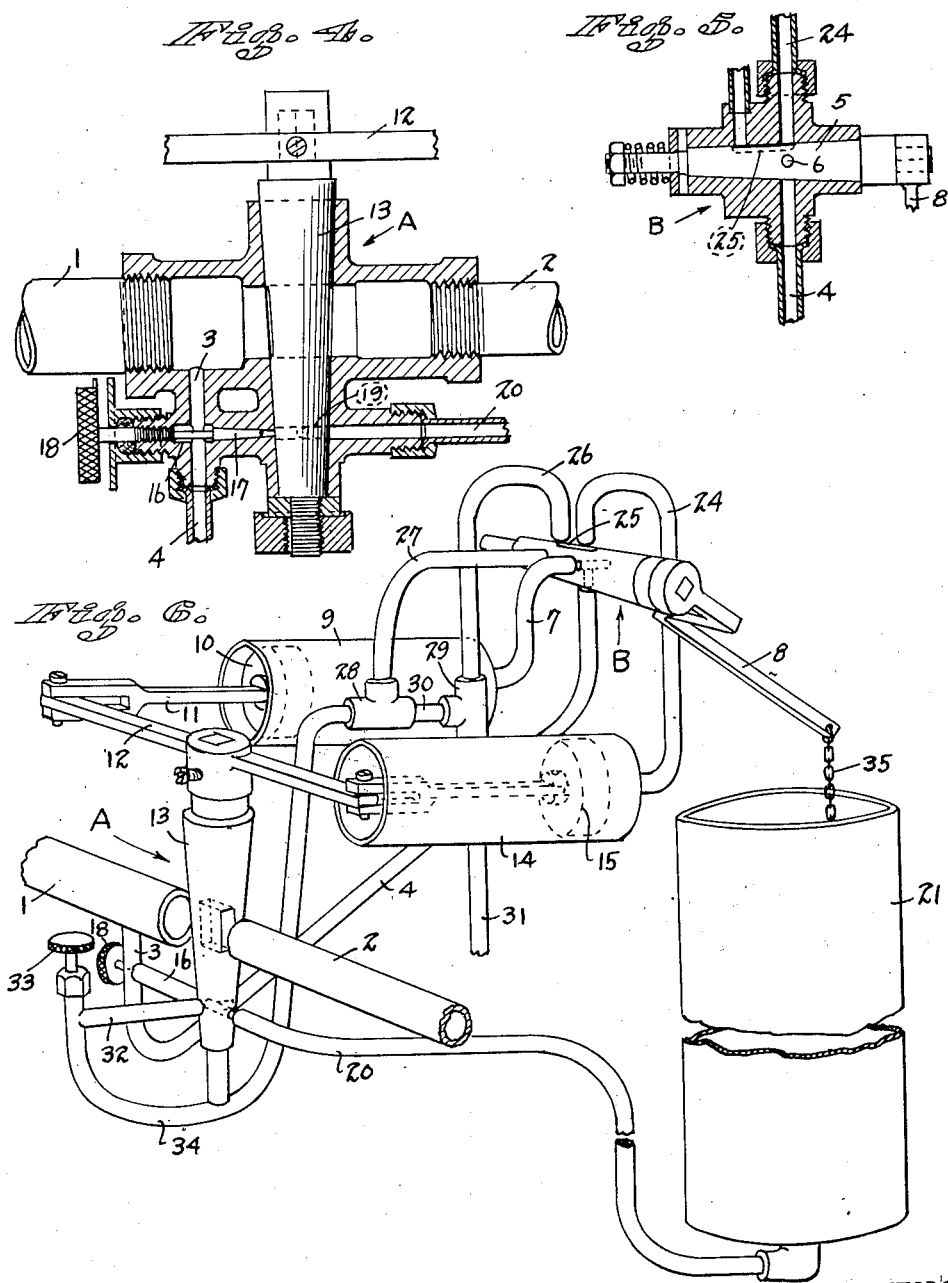
INVENTORS
THOMAS LONGBOTHAM
MORRIS BLEICH
BY
ATTORNEYS.

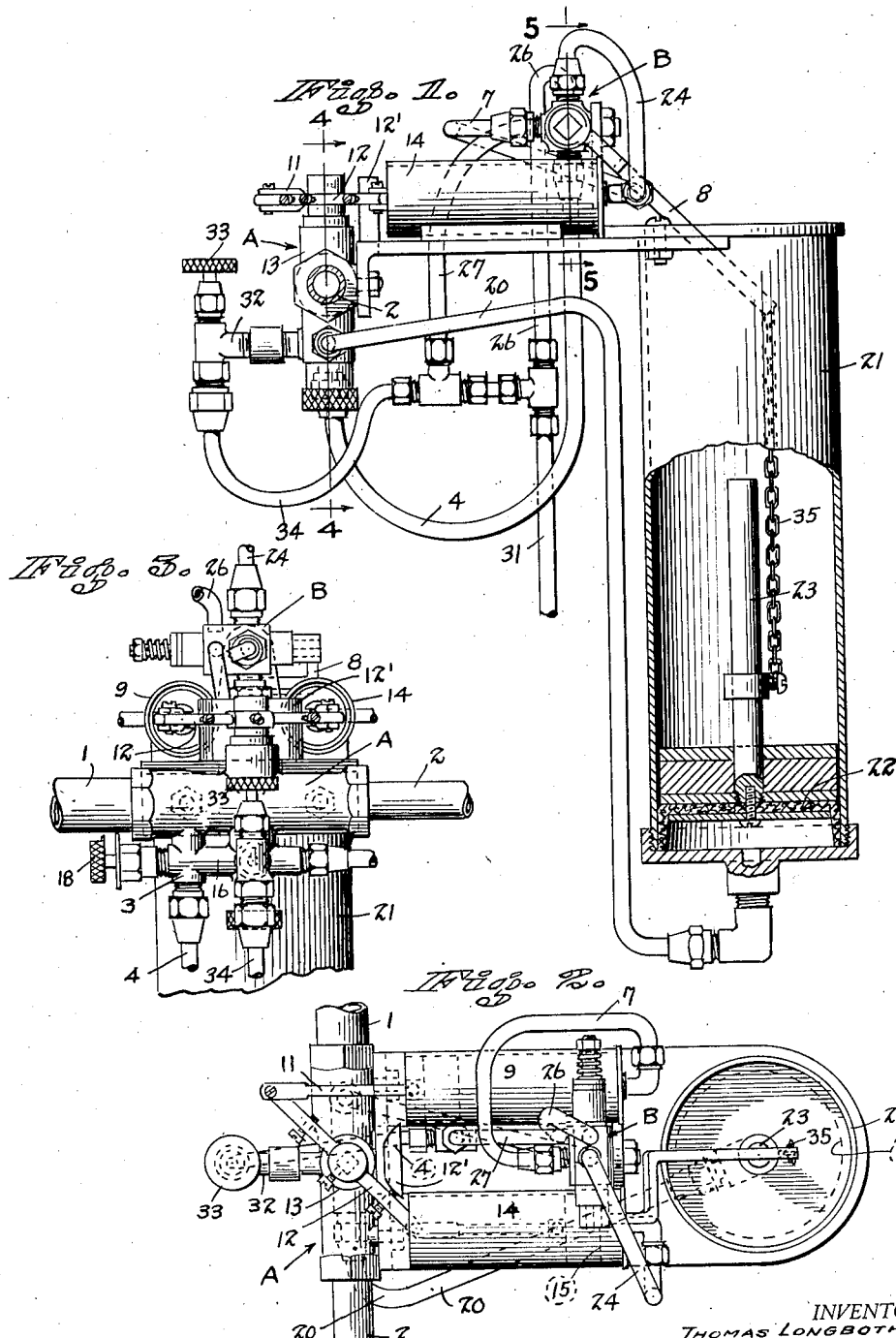

Patented Sept. 6, 1932

1,875,623

UNITED STATES PATENT OFFICE

THOMAS LONGBOTHAM AND MORRIS BLEICH, OF PORTLAND, OREGON

AUTOMATIC TIMING MECHANISM

Application filed October 1, 1929. Serial No. 396,523.

Our invention relates to improvements in automatic timing mechanisms, and it consists in the combinations, constructions and arrangements hereinafter described and claimed.

An object of our invention is to provide an automatic timing mechanism which, in the present instance, is designed to control a sprinkler system, although it may be used for entirely different purposes. The device is actuated by water, although it may be actuated just as effectively by any other fluid or air.

In connection with lawn sprinkler systems, it is merely necessary to turn on the water supply to the device and attach the water outlet pipe from the device to the sprinklers. The device will operate automatically from this point on. Novel means is provided for automatically turning on the water to the sprinklers at a predetermined time and for keeping the water turned on for a second period of time. At the end of this second period, the water is automatically shut off, and then after the first period of time has again elapsed, the water is turned on. These two periods of time may be varied at will. For example, the water may be turned into the sprinkler system every twelve hours and allowed to run for a period of thirty minutes and then be shut off. At the expiration of another twelve hours, the water will be automatically turned into the sprinklers again.

In order to make the device function accurately, we provide novel means for turning on the device after a given time period regardless of the pressure of the water. The device is simple in construction, and is durable and efficient for the purpose intended.

Other objects and advantages will appear as the specification proceeds, and the novel features of the invention will be particularly pointed out in the claims hereto attached.

Our invention is illustrated in the accompanying drawings, in which:

Figure 1 is a side elevation of the device showing a portion of one of the cylinders broken away, Figure 2 is a top plan view, Figure 3 is an end elevation, Figure 4 is a section along the line 4—4 of Figure 1, Figure 5 is a section along the line 5—5 of Figure 1, and Figure 6 is a schematic showing of the entire device.

In carrying out our invention, it will be noted from Figures 2 and 3 that we provide a valve indicated generally at A which has a water inlet pipe 1 connected thereto and a water outlet pipe 2 leading therefrom. The pipe 2 is smaller in diameter than the pipe 1 in order to create the necessary head of water, and this pipe is connected to a sprinkler system, not shown, or any other device in which it is desired to periodically feed water for a certain length of time.

It is thought that the invention will be best understood if the operation is described as the structure is set forth. It is best to assume that the valve A is open and that water will readily flow from the pipe 1 through the valve A and into the pipe 2. A part of the water flowing in the pipe 1 is by-passed and is used for actuating the means which shuts off the valve A.

In Figures 3, 4 and 6 we show a by-pass 3 that leads to a pipe 4, and this pipe in turn communicates with a valve B. Figure 5 shows how the pipe 4 is connected to the valve casing, and Figure 6 shows how the valve body 5 is provided with a T-shaped passageway 6. The passageway 6 places the pipe 4 in communication with a pipe 7 when the arm 8 of the valve B is in its downward position. It will therefore be seen that the water will enter a cylinder 9 from the pipe 7 and will keep a piston 10 up against the open end of the cylinder. The piston 10 has a connecting rod 11 pivotally secured to a lever 12 of the valve body 13 in the valve A. The piston 10 will therefore hold the valve body 13 in a position where the water can flow from the pipe 1 into the pipe 2.

A part of the water from the by-pass 3 is used for actuating a mechanism for turning the valve B, and the turning of this valve will direct water into a second cylinder 14 similar to the cylinder 9, and will move a piston 15 in the cylinder for swinging the lever 12 into an off position. It will be noted from Figure 4 that the passageway 3 communicates with a passageway 16. The latter passageway is controlled by a needle valve 17, and the valve is opened or closed by means of a knurled knob 18. The passageway 16 in Figure 6 is shown communicating with a T-shaped passageway 19 in the valve body 13. When the valve body 13 is in open position, water can flow from the passageway 16 through the passageway 19 and into a pipe 20. Figures 1, 2 and 6 show the pipe 20 as leading to the bottom of a control cylinder 21. The cylinder 21 may be of any size desired, and is preferably made large so as to provide a storage for the control water that will permit the sprinkler to function for a period of approximately thirty minutes or longer if desired. The water flowing through the pipe 20 toward the cylinder 21 can be accurately controlled by the needle valve 17. The water in entering the cylinder 21 lifts a weighted piston 22. The speed at which the piston 22 rises determines the time period for delivering water to the sprinklers.

It will be seen from Figure 1 that the piston 22 has a rigid and vertically-extending piston rod 23. This rod is disposed directly beneath the arm 8, and is designed to engage the arm for swinging the valve body 5 when the piston 22 reaches the top of its stroke.

Assume that the piston 22 has reached the top of its stroke, and that therefore the timed period for watering has expired and it is desired to close the valve A. The piston rod 23 actuates the valve body 5 and swings the T-shaped passageway 6 (see Figure 6) so as to disconnect the pipes 4 and 7 and to connect the pipe 4 with a pipe 24 that leads to the cylinder 14. The water flowing through the pipe 4 will therefore enter the cylinder 14 and move the piston 15 so as to close the valve A.

It should be noted that during the movement of the piston 15 to the left in Figure 6, the piston 10 is moved to the right. We provide means for carrying away the water in the cylinder 9. It will be noted that the valve body 5 has a groove 25 that is shown placing the pipe 24 in communication with a drain pipe 26. We have already stated that the valve B has been turned by the rising piston 22, and this turning movement is sufficient to place the groove 25 in a position where it will connect the pipe 7 with a drain pipe 27. The piston 10 will force water from the cylinder 9 through the pipe 7, along the groove 25, and thence into the drain pipe 27. The drain pipe 27 is connected to the pipe 26 by two T's 28 and 29 and a stub pipe 30. An outlet pipe 31 communicates with the T 29 and conveys the water away.

The swinging of the valve A into closed position not only cuts off water from the pipe 1 to the pipe 2, but also swings the T passageway 19 so as to cut off communication between the passageway 16 and pipe 20 and to place the pipe 20 in communication with a drain pipe 32. The pipe 32 carries a needle valve 33 (see Figures 1 and 6), and this needle valve controls the flow of water from the cylinder 21 into a pipe 34 that communicates with the T 28. The drain of water from the cylinder 21 can be so regulated by the valve 33 that a time period of twelve hours, or longer if desired, can elapse before the piston 22 again reaches the bottom of the cylinder.

It should be noted that the time period between sprinkling operations is constant and independent of the pressure of the water in the main line 1. The water in the cylinder 21 is forced out by the weighted piston 22, and since this weight remains the same at all times, the outflow of water will be the same.

The piston rod 23 is connected to the arm 8 by means of a chain 35. This chain has enough slack in it to permit the piston to reach its lowermost position before the arm 8 will be swung back into the position shown in Figures 1 and 7. When the arm 8 again reaches this position, communication is established between the pipe 4 and the pipe 7 and is cut off between the pipe 4 and the pipe 24. Water will therefore again flow into the cylinder 9 and will be forced out of the cylinder 14. The water flowing from the cylinder 14 will pass into the pipe 24 and then into the drain pipe 26 due to the fact that the groove 25 now connects these pipes together. The piston 10 will open the valve A and the cycle of operation is again repeated. These various operations will continue automatically and indefinitely so long as water is furnished by the pipe 1.

The time periods can be accurately regulated by the needle valves 17 and 33. The valve 17 controls the speed of the upward movement of the piston 22, while the valve 33 controls the downward movement. The flow of water into the cylinders 9 and 14 does not need to be regulated, because these cylinders are used for the sole purpose of actuating the valve A.

The lever 12 is limited in its movement by a stop 12'. If desired, the lever may be provided with screws that are adjustably mounted in the lever arms, these screws striking the stop 12' so as to bring the lever to a predetermined stop in either of its two positions.

Although we have shown and described one embodiment of our invention, it is to be understood that the same is susceptible of various changes, and we reserve the right to employ such changes as may come within the scope of the invention as claimed.

We claim:
1. A fluid controlled automatic timing mechanism comprising a main fluid passageway, a main valve disposed in said passageway, fluid-controlled means for actuating said valve, said means including a storage cylinder, a piston mounted in said cylinder, said means also including an auxiliary valve actuated by the piston and auxiliary pistons and cylinders, connections between the auxiliary pistons and the main valve, fluid communications between the auxiliary cylinders and the main passageway and being controlled by the auxiliary valve, said auxiliary valve when actuated by said storage cylinder piston causing fluid from the main passage to flow first into one auxiliary cylinder and then into the other for actuating said main valve, said auxiliary valve first shunting a portion of it into the storage cylinder until the latter is filled and then draining the fluid from the cylinder.

2. An automatic timing mechanism comprising a main fluid passage, a main valve therefor, fluid-actuated means for actuating said valve, a fluid by-pass leading from a position in front of the valve to said means, an auxiliary valve controlling the flow of fluid in said by-pass, a fluid storage cylinder, a second fluid by-pass leading from the first by-pass and communicating with the storage cylinder, a piston mounted in said cylinder and being operatively connected to said auxiliary valve, and an outlet pipe for said cylinder, said main valve cutting off the flow of fluid to the cylinder when said valve is in closed position, and placing said outlet pipe in communication with the cylinder.

3. An automatic timing mechanism comprising a main fluid passage, a main valve therefor, fluid-actuated means for actuating said valve, a fluid by-pass leading from a position in front of the valve to said means, an auxiliary valve controlling the flow of fluid in said by-pass, a fluid storage cylinder, a second fluid by-pass leading from the first by-pass and communicating with the storage cylinder, a piston mounted in said cylinder and being operatively connected to said auxiliary valve, an outlet pipe for said cylinder, said main valve cutting off the flow of fluid to the cylinder when said valve is in closed position, and placing said outlet pipe in communication with the cylinder, and needle valves controlling the flow in said second by-pass and said outlet pipe.

4. In an automatic fluid-actuated timing mechanism, a fluid storage cylinder, a piston mounted therein, a main fluid passage, a by-pass leading to the cylinder for causing fluid from the main passage to raise the piston, means actuated by the piston when it reaches the top of the cylinder to cut off the fluid in the main passage and in the by-pass, an outlet pipe, said means including a valve for placing said cylinder in communication with said outlet pipe, said means again being actuated when the piston reaches the bottom of its stroke for again opening up the main passage and the by-pass to said cylinder.

5. In an automatic timing mechanism, a main fluid passageway, a main valve therefor, a pair of cylinders having pistons mounted therein, a lever having its arms connected to the pistons and the main valve, fluid conduits leading to said cylinders from the main passageway and having the main valve arranged therein, a second valve for causing the fluid to enter one cylinder and to empty from the other or vice versa through the conduits communicating with the cylinders, a storage cylinder, a piston in the storage cylinder connected to the second valve, and a conduit for conveying part of the fluid from the main passageway to or from the storage cylinder and controlled by the main valve.

6. In an automatic timing mechanism, a main fluid passageway, a main valve therefor, a pair of cylinders having pistons mounted therein, a lever having its arms connected to the pistons and the main valve, fluid conduits leading to said cylinders from the main passageway and having the main valve arranged therein, a second valve for causing the fluid to enter one cylinder and to empty from the other or vice versa through the conduits communicating with the cylinders, a storage cylinder, a piston in the storage cylinder connected to the second valve, and a conduit for conveying part of the fluid from the main passageway to or from the storage cylinder and controlled by the main valve, and means for adjusting the movements of said levers.

THOMAS LONGBOTHAM.
MORRIS BLEICH.